(12) United States Patent
Dierickx (10) Patent No.: US 8,063,963 B2
(45) Date of Patent: *Nov. 22, 2011

(54) IMAGING DEVICE HAVING A PIXEL STRUCTURE WITH HIGH DYNAMIC RANGE READ-OUT SIGNAL

(75) Inventor: Bart Dierickx, Edegem (BE)

(73) Assignee: ON Semiconductor Image Sensor, Mechelen (BE)

( * ) Notice: Subject to any disclaimer, the term of this patent is extended or adjusted under 35 U.S.C. 154(b) by 1456 days.

This patent is subject to a terminal disclaimer.

(21) Appl. No.: 11/030,721

(22) Filed: Jan. 6, 2005

(65) Prior Publication Data

US 2005/0167602 A1 Aug. 4, 2005

Related U.S. Application Data

(63) Continuation-in-part of application No. 09/460,473, filed on Dec. 14, 1999, now Pat. No. 7,106,373, which is a continuation-in-part of application No. 09/021,011, filed on Feb. 9, 1998, now Pat. No. 6,011,251.

(51) Int. Cl.
*H04N 3/14* (2006.01)
*H04N 5/335* (2011.01)
*H01L 27/00* (2006.01)

(52) U.S. Cl. ........ 348/308; 348/294; 348/296; 348/297; 348/302; 348/314; 250/208.1

(58) Field of Classification Search .......... 348/294–324; 250/208.1
See application file for complete search history.

(56) References Cited

U.S. PATENT DOCUMENTS

| 3,770,968 | A | 11/1973 | Hession et al. |
| 4,473,836 | A | 9/1984 | Chamberlain |
| 4,565,756 | A | 1/1986 | Needs |
| 4,580,103 | A | 4/1986 | Tompsett |
| 4,647,975 | A | 3/1987 | Alston et al. |
| 4,703,169 | A | 10/1987 | Arita |
| 5,146,074 | A | 9/1992 | Kawahara et al. |

(Continued)

FOREIGN PATENT DOCUMENTS

EP 548 987 6/1993

(Continued)

OTHER PUBLICATIONS

Anderson, S., et al., "A Single Chip Sensor & Image Processor or Fingerprint Verification," *IEEE 1991 Custom Integrated Circuits Conference*, May 12-15, 1991, pp. 12.1.1-12.1.4.

(Continued)

*Primary Examiner* — Timothy J Henn
*Assistant Examiner* — Michael Osinski
(74) *Attorney, Agent, or Firm* — Rennie William Dover

(57) ABSTRACT

A method obtains a read-out signal of a pixel having at least a photosensitive element with a charge storage node. The method includes the steps of acquiring charge carriers, converted from impinging radiation on the photosensitive element, on the charge storage node, applying during the integration period at least one reset pulse, resetting incompletely the charge carriers acquired at the moment of applying the reset pulse, to obtain at least one linear response region for the pixel, and driving the pixel in weak inversion after the last incomplete reset pulse of the integration period so as to obtain a logarithmic response part. A corresponding pixel is also described.

7 Claims, 7 Drawing Sheets

U.S. PATENT DOCUMENTS

| | | | |
|---|---|---|---|
| 5,153,420 | A | 10/1992 | Hack et al. |
| 5,164,832 | A * | 11/1992 | Halvis et al. .................. 348/250 |
| 5,258,845 | A | 11/1993 | Kyuma et al. |
| 5,283,428 | A | 2/1994 | Morishita et al. |
| 5,296,696 | A | 3/1994 | Uno |
| 5,321,528 | A | 6/1994 | Nakamura |
| 5,329,112 | A | 7/1994 | Mihara |
| 5,335,008 | A | 8/1994 | Hamasaki |
| 5,608,204 | A | 3/1997 | Hofflinger et al. |
| 5,614,744 | A | 3/1997 | Merrill |
| 5,724,047 | A | 3/1998 | Lioio et al. |
| 5,841,126 | A | 11/1998 | Fossum |
| 5,861,621 | A | 1/1999 | Takebe |
| 5,872,596 | A | 2/1999 | Yanai |
| 5,933,190 | A | 8/1999 | Dierickx |
| 5,953,060 | A | 9/1999 | Dierickx |
| 6,011,251 | A | 1/2000 | Dierickx et al. |
| 6,133,563 | A | 10/2000 | Clark et al. |
| 6,316,760 | B1 | 11/2001 | Koyama |
| 6,459,077 | B1 | 10/2002 | Hynecek |
| 6,570,618 | B1 | 5/2003 | Hashi |
| 6,600,471 | B2 * | 7/2003 | Lee et al. .................. 345/90 |
| 7,106,373 | B1 * | 9/2006 | Dierickx .................. 348/308 |
| 7,283,168 | B2 * | 10/2007 | Watanabe .................. 348/308 |
| 2003/0231252 | A1 * | 12/2003 | Findlater et al. .................. 348/297 |
| 2004/0021058 | A1 * | 2/2004 | Drowley et al. .................. 250/208.1 |
| 2004/0196398 | A1 * | 10/2004 | Doering et al. .................. 348/308 |
| 2005/0117042 | A1 * | 6/2005 | Hirotsu et al. .................. 348/308 |

FOREIGN PATENT DOCUMENTS

| | | |
|---|---|---|
| EP | 657 863 | 6/1995 |
| EP | 739 039 | 10/1996 |
| EP | 0 773 669 A2 | 5/1997 |
| EP | 0773669 A2 | 5/1997 |
| EP | 0 632 930 B1 | 7/1998 |
| EP | 0632930 B1 | 7/1998 |
| EP | 0 858 111 A1 | 8/1998 |
| EP | 0 858 212 A1 | 8/1998 |
| EP | 0858111 A1 | 8/1998 |
| EP | 0858212 A1 | 8/1998 |
| GB | 2 324 651 | 10/1998 |
| JP | 01-204579 | 8/1989 |
| JP | 02-050584 | 2/1990 |
| JP | 04-207589 | 7/1992 |
| JP | 05-030433 | 2/1993 |
| JP | 06-284347 | 10/1994 |
| JP | 07-072252 | 3/1995 |
| JP | 9298286 A | 11/1997 |
| JP | 10093069 A | 4/1998 |
| WO | 93/19489 | 9/1993 |
| WO | 97/07630 A1 | 2/1997 |
| WO | 97/21304 A1 | 6/1997 |

OTHER PUBLICATIONS

Aoki, et al., "A Collinear 3-Chip Image Sensor," *IEEE International Solid-State Circuits Conference*, 1985, pp. 102-103.

Aw, Chye Huat, et al., "A 128 × 128-Pixel Standard-CMOS Image Sensor with Electronic Shutter," *IEEE Journal of Solid State Circuits*, vol. 31, No. 12, Dec. 1996, pp. 1922-1930.

Dierickx, Bart, "XYW Detector: A Smart Two-Dimensional Particle Sensor," *Nuclear Instruments and Methods in Physics Research A275*, North-Holland Physics Publishing Division, 1989, pp. 542-544.

Horii, et al., "A 490 × 404 Element Imager for a Single-Chip Color Camera," *IEEE International Solid State Circuits Conference*, 1985, pp. 96-97.

Klein, P., "Design Performance of Semiconductor Detectors with Integrated Amplification and Charge Storage Capability," *Nuclear Instruments and Methods in Physics Research A305*, 1991, pp. 517-526.

Mahowald, M.A., "Silicon Retina with Adaptive Photoreceptors," *SPIE*, vol. 1473, 1991, pp. 52-58.

Mann, J., "Implementing Early Visual Processing in Analog VLSI: Light Adaptation," *SPIE*, vol. 1473, 1991, pp. 128-136.

Martin, W.J., et al., "Dynamic Offset Null," *IBM Technical Disclosure Bulletin*, vol. 23, No. 9, Feb. 1981, pp. 4195-4196.

Nagakawa, et al., "A 580 × 500-Element CCD Imager with a Shallow Flat P Well," *IEEE International Solid-State Circuits Conference*, 1985, pp. 98-99.

Ono, et al., "Analysis of Smear Noise in Interline-CCD Image Sensor with Gate-Free Isolation Structure," *Japanese Journal of Applied Physics*, vol. 30, No. 12B, Dec. 1991, pp. 3621-3626.

Ricquier, et al., "Pixel Structure with Logarithmic Response for Intelligent and Flexible Imager Architectures," *Microelectronic Engineering*, vol. 19, 1992, pp. 631-634.

Sevenhans, et al., "A 400mm Long Linear X-Ray Sensitive Image Sensor," *IEEE International Solid-State Circuits Conference*, 1987, pp. 108-109.

Yadid-Pecht, et al., "A Random Access Photodiode Array for Intelligent Image Capture," *IEEE Transactions on Electron Devices*, vol. 38, No. 8, Aug. 1991.

* cited by examiner

IMAGING DEVICE HAVING A PIXEL STRUCTURE WITH HIGH DYNAMIC RANGE READ-OUT SIGNAL

CLAIM OF PRIORITY

This application is a continuation-in-part of U.S. patent application Ser. No. 09/460,473, filed Dec. 14, 1999, now U.S. Pat. No. 7,106,373 which is incorporated in its entirety by reference herein, and which is a continuation-in-part of U.S. patent application Ser. No. 09/021,011, filed Feb. 9, 1998, issued as U.S. Pat. No. 6,011,251, which is incorporated in its entirety by reference herein.

BACKGROUND OF THE INVENTION

1. Field of the Invention

The present invention relates generally to solid-state imaging devices. More particularly, the present invention is related to a method of obtaining a read-out signal with a large dynamic range on an imaging device with a pixel structure.

2. Description of the Related Art

Solid-state image sensors are well known. Virtually all solid-state imaging sensors have a photosensitive element as a key element, for example, a photoreceptor, a photo-diode, a photo-transistor, a CCD gate, or the like. Typically, the signal of such a photosensitive element is a current that is proportional to the amount of electromagnetic radiation (light) falling onto the photosensitive element.

A structure with a photosensitive element included in a circuit having accompanying electronics is called a pixel. Such pixel can be arranged in an array of pixels so as to build focal plane arrays.

Commonly such solid-state image sensors are implemented in a CCD-technology or in a CMOS- or MOS-technology. Solid-state image sensors find a widespread use in devices such as camera systems. In such systems, a matrix of pixels comprising light sensitive elements constitutes an image sensor, which is mounted in the camera system. The signal of said matrix is measured and multiplexed to a so-called video-signal.

Of the image sensors implemented in a CMOS- or MOS-technology, CMOS or MOS image sensors with passive pixels and CMOS or MOS image sensors with active pixels are distinguished. An active pixel is configured with means integrated in the pixel to amplify the charge that is collected on the light sensitive element. Passive pixels do not have said means and require a charge sensitive amplifier that is not integrated in the pixel. For this reason, active pixel image sensors are potentially less sensitive to noise fluctuations than passive pixels. Due to the additional electronics in the active pixel, an active pixel image sensor may be equipped to execute more sophisticated functions, which can be advantageous for the performance of the camera system. Said functions can include filtering, operation at higher speed, or operation in more extreme illuminations conditions.

Examples of such imaging sensors are disclosed in EP-A-0739039, EP-A-0632930, and in U.S. Pat. No. 5,608,204. The imaging devices based on the pixel structures as disclosed in these European patent applications and U.S. patent however are still subject to deficiencies in the image quality of the devices.

There is an ongoing effort to increase the performance of CMOS or MOS image sensors such that a comparable image quality is obtained as the one obtained with high-end CCD imagers. Due to the miniaturization of the technology of CMOS based electronic circuits, it is further possible to realize complex CMOS- or MOS-based pixels as small as CCD-based pixels. It is a main advantage of CMOS- or MOS-based image sensors that CMOS technology is being offered by most foundries whereas CCD-technology is rarely offered and a more complex and expensive technology option.

In the co-pending patent applications and patents EP-A-0739039, EP-A-0858111, EP-A-094003 1, EP-A-0773669, EP-A-0858212, U.S. Pat. Nos. 5,933,190, and 5,953,060, pixel structures and methods of addressing them are described which address the issues summarized here-above. The contents of these patent applications are incorporated herein by reference.

In general, it must be recognized that for an imaging device, three specifications that are difficult to match are to be met:
 the sensitivity of the image device, especially in the dark,
 the cosmetic quality of the image, this means that the image should be flawless, and
 the requirement of a response with a high dynamic range.

Image sensors having a non-linear response such as a logarithmic response are known from, e.g., EP-A-0739039.

However, most of the image sensors with passive or active pixels have a linear voltage-to-light response. This means that their dynamic range is limited by the dynamic range of the linear response. For instance, if the linear output voltage has an S/N (signal-to-noise) ratio of about 250, which is a typical value, the corresponding dynamic range will be the same.

Image sensors with a double linear response or multiple linear responses are known. In such sensors, two or more linear pieces of optical response are combined in one electrical output signal, outside the pixel. Presently, the classical image sensors can be used to obtain such double linear response image by capturing two images with different sensitivity and combining them.

U.S. Pat. No. 5,164,832 discloses a CCD-circuit having a response curve that has two sensitivity ranges. The CCD circuit has a clipping gate that is in a parallel configuration on the CCD. In order to obtain a response curve, the light integration period is split in a first and second integration periods. During the first integration period, the clipping gate is set to a specific DC voltage that removes the signals being generated by a high light intensity impinging on the CCD. During the second integration period, this limitation is removed. The high signals will add to the result during the second period only, low signals will add all the time.

The collected photocharge during the first period of the integration time is limited; during the second period, the limitation is removed. This limitation that can be removed is obtained with a clipping gate that is set to one DC voltage during the first period, and to another during the second period. This said gate continuously removes charge that is in excess.

SUMMARY OF THE INVENTION

Certain embodiments provide a method for obtaining a read-out signal of a pixel, for example a MOS-based pixel, having at least a photosensitive element and a charge storage node, e.g. an output node of the photosensitive element or a parasitic capacitor of the photosensitive element. The method comprises, while acquiring charge carriers on said charge storage node during an integration period, said charge carriers being converted from radiation impinging on the photosensitive element, during a first time period of said integration period applying at least one reset pulse with a predetermined amplitude on said charge storage node, said pulse resetting incompletely the charge carriers acquired at the moment of applying said pulse; and after each of said at least one reset pulse further acquiring charge carriers on said charge storage node. The method further comprises driving said pixel in weak inversion during a second time period after the last incomplete reset pulse of said integration period and further acquiring charge carriers on said charge storage node during said second time period. The voltage/power response of a pixel read-out according to certain embodiments shows at least one piece-wise linear piece and a final logarithmic saturation behavior. Certain such embodiments improve the dynamic range of the image sensor.

During the first time period, a plurality of reset pulses may be applied on the charge storage node, thus obtaining a voltage-to-light/radiation response with multiple linear response regions. At least two of said plurality of reset pulses may have different amplitudes.

The method according to certain embodiments may further comprise applying a reference signal on said charge storage node whereon said at least one reset pulse is superimposed.

Said at least one reset pulse in certain embodiments is delivered by a reset transistor, said reset transistor being in series with said photosensitive element.

In certain embodiments, the read-out signal may be function of a combination of charges acquired prior and after application of said reset pulses.

Certain embodiments provide a pixel comprising a photosensitive element, a charge storage node for storing a signal from the photosensitive element at a moment in time, and a reset terminal on a reset transistor, said reset terminal equipped for applying a pulsed reset signal to the reset transistor, wherein said pixel further comprises driving means for driving the reset transistor in weak inversion.

The reset transistor may be coupled in series with said photosensitive element.

The photosensitive element may have an output node, said charge storage node being the output node of said photosensitive element. Alternatively, the photosensitive element may have a parasitic capacitor and the charge storage node may be the parasitic capacitor of the photosensitive element.

A pixel according to certain embodiments further comprises an amplifying element directly or indirectly connected to said charge storage node, the amplifying element amplifying or buffering the signal on said charge storage node for further signal processing.

A pixel according to certain embodiments is implemented in a MOS technology.

BRIEF DESCRIPTION OF THE DRAWINGS

FIG. 1 represents an exemplary pixel compatible with certain embodiments described herein. Shown in FIG. 1 are a photodiode (12) and a reset transistor (11) as well as an amplifying element (14). A switch transistor (15) connects the pixel to the column output (16) whereon the output voltage is taken. The photodiode has an output node which serves as the charge storage node (17).

FIG. 12 shows an implementation of an exemplary image sensor in accordance with certain embodiments described herein. On an array of pixels (100), the reset pulses can be generated at the edges parallel to the columns of the image sensor. In an implementation of FIG. 12, a main reset pulse for consecutive lines of pixels is generated by the circuitry at the left side of the array (110). A vector of reset line drives is fed by a common "reset amplitude 1." At the right side (120) a similar circuit is present that can apply also pulses or voltages to the reset lines.

DETAILED DESCRIPTION OF EXEMPLARY EMBODIMENTS

Certain embodiments described herein aim to disclose an active or passive pixel of an imaging device such that with one single pixel, a multiple voltage-to-light/radiation response can be obtained, having at least one or multiple linear response regions and a logarithmic response region.

Certain embodiments described herein further aim to disclose a method of reading out an active or passive pixel of an imaging device such that a multiple voltage-to-light/radiation response, having at least one or multiple linear response regions and a logarithmic response region, can be obtained in one single image or read-out scan.

The present invention is described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

The invention is described herein through a detailed description of several embodiments of the invention. It is obvious that other embodiments of the invention can be configured according to the knowledge of persons skilled in the art without departing from the true spirit of the invention, the invention being limited only by the terms of the appended claims.

In certain embodiments, a method obtains a read-out signal of a pixel having at least a photosensitive element with a charge storage node, the method comprising the steps of while acquiring charge carriers on said charge storage node during an integration period, said charge carriers being converted from radiation impinging on the photosensitive element, during a first time period of said integration period applying at least one pulsed reset signal with a predetermined amplitude on said-charge storage node, said amplitude being within the range of read-out signal acquisition and resetting incompletely the charge carriers acquired at the moment of applying said pulse, and after each of said at least one reset pulses further acquiring charge carriers on said charge storage node. During a second time period of the integration period, after the last incomplete reset pulse of the integration period, the pixel is driven in weak inversion and charge carriers are further acquired on said charge storage node during said second time period. The read-out signal thereby is a combination of signals acquired prior to and after the application of said pulsed reset signal. Depending on the relative amplitudes of the pulsed reset signal and of the actual signal resulting directly from the charge carrier acquisition, the resulting read-out signal obtained during the first time period can be different or identical to a signal acquisition method wherein said pulsed reset signal is not applied. Both possible resulting signals are denoted as a combination of signals acquired prior to and after the application of said pulsed reset signal. The voltage/power response of a pixel read-out according to the present invention shows at least one piece-wise linear piece and a final logarithmic saturation behavior. In certain embodiments, the method also comprises the step of applying a prior pulsed reset signal on said charge storage node, prior to the step of acquiring charge carriers on said charge storage node. During the time of application of said prior pulsed reset signal and during the time of application of said pulsed reset signal on said charge storage node, acquisition of charge carriers is blocked.

Figure 1:
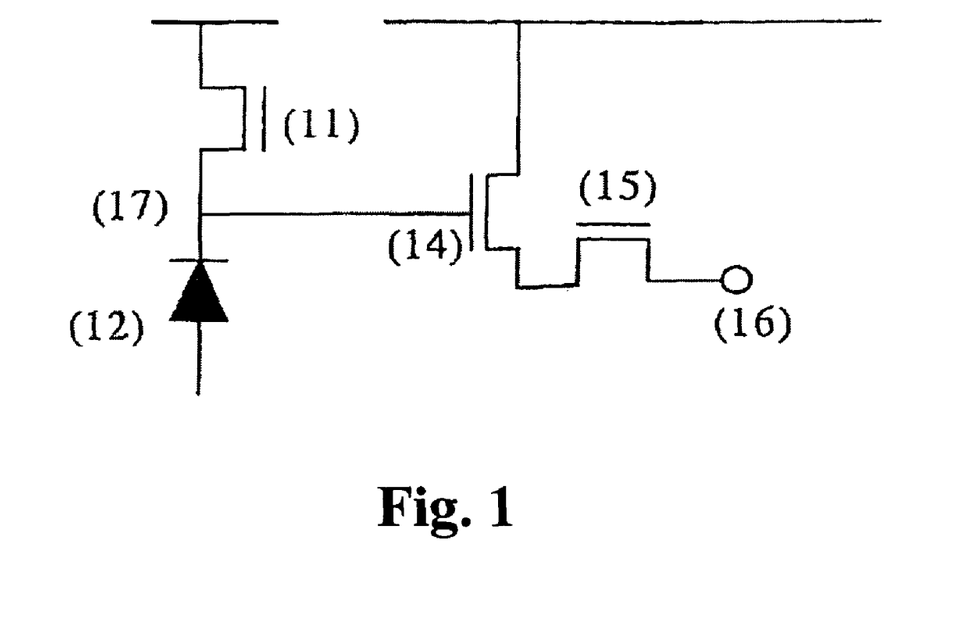

Certain embodiments of the method described herein can be applied to a pixel, for example, the classic 3-transistor (3T) integrating active pixel of an imaging device as disclosed in the paper "A Random Access Photodiode Array for Intelligent Image Capture," IEEE Transactions El. Dev. 38 (8), 1772 (1991). Persons skilled in the art can convert the teaching of U.S. Pat. No. 5,933,190 to an integrating pixel structure and certain embodiments of the method described herein can be applied to the 3-transistor (3T) pixel disclosed therein. The patent application EP-0858111 also discloses a 3T pixel to which certain embodiments of the method described herein can be applied. The teaching of above-referenced documents is incorporated by reference in the present patent application. A 3T-pixel is shown in FIG. 1. The pixel has a reset terminal or transistor (11) for applying a pulsed reset signal. The pixel has a photodiode (12) and a charge storage node (17) and an amplifying element or transistor (14). In certain embodiments, the method is also applied to any pixel that has a node with a reset transistor and a memory element such as a capacitor for charge storage. In the 3T pixel, the capacitor is the parasitic capacitor of the photodiode. In certain embodiments described herein, said reset pulse signal is forcing a voltage on said charge storage node (17) and during the time of application of said reset pulse on said charge storage node (17), acquisition of charge carriers is blocked. By applying certain embodiments of the method described herein to the pixel described here-above, the resulting read-out signal is not a linear function of the amount of light received, but has a partially linear slope, for example a multiple piece-wise linear slope, and a final logarithmic saturation behavior. The slope of the read-out signal, i.e., the slope of output voltage versus light intensity or integration time, can be varied by the electronic shutter, i.e., the application of the reset pulse signal for certain embodiments. The slope of the read-out signal, i.e. the slope of output voltage versus light intensity or integration time, corresponding to a lower sensitivity (light to voltage), can be varied by the electronic shutter. Thus, in certain embodiments, the method is described as a facility to reduce the duration of the observation time of a pixel. The multiple slope method has a different effect on the high intensity part of an image compared to the low intensity part. It compresses the high intensity part of an image, but preserves the low intensity part. It has a comparable property as a gamma correction or as a logarithmic compression, which are known to the person of skill in the art, yet it can be tuned within a wide range to accommodate various light conditions.

Exemplary embodiments for reading the signal of the pixel in order to obtain the linear, possibly multiple linear, and logarithmic slope, as applied to a 3T-pixel as in FIG. 1 are described herebelow.

According to certain embodiments, the voltage/power response of a pixel shows at least one linear portion, possibly a multiple piece-wise linear portion, and a final logarithmic saturation behavior. This allows further improvement of the dynamic range of the image sensor and can be obtained in the above mentioned pixel structure, if it is equipped with driving means for driving the pixel in weak inversion.

Figure 2:
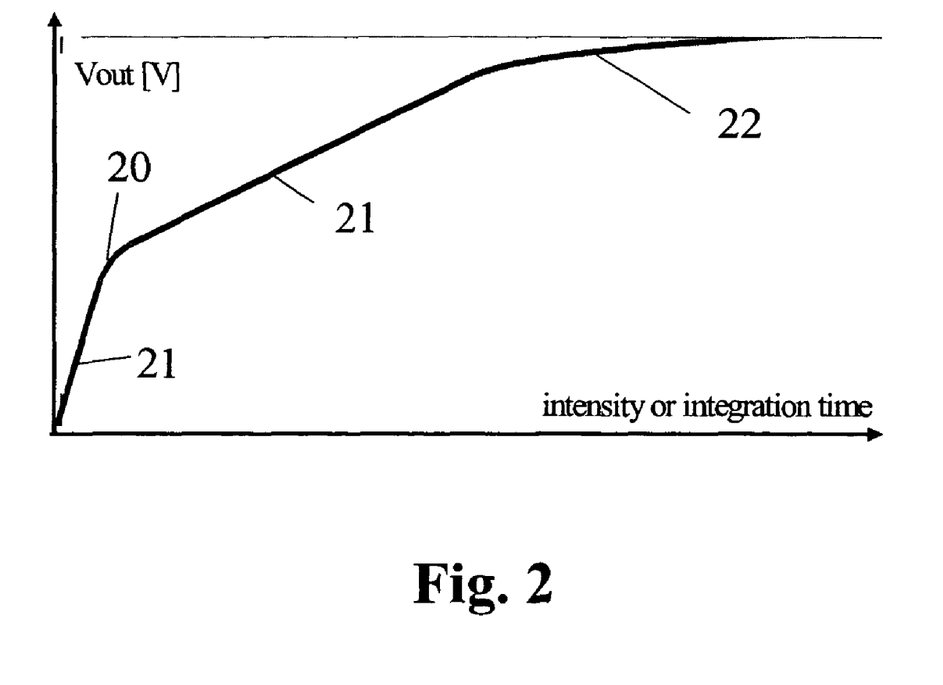
FIG. 2 represents a graph of the voltage output signal as a function of the intensity or integration time during read-out of a pixel in accordance with certain embodiments described herein.

In FIG. 2, the output voltage is shown as a function of intensity or integration time, for a read-out having a multiple piece-wise linear behavior—a double linear behavior is shown—and a final logarithmic saturation behavior. The transition points 20 between the different piece-wise linear pieces 21, i.e. the joints where the different piece-wise linear pieces 21 are connected, are not infinitely sharp but have a logarithmic shape. This shape is approximately described by Equation (1):

$$V = \log(P) \cdot kT/q. \tag{1}$$

The transitions between the different linear pieces 21 thus are smooth transitions.

Figure 3:
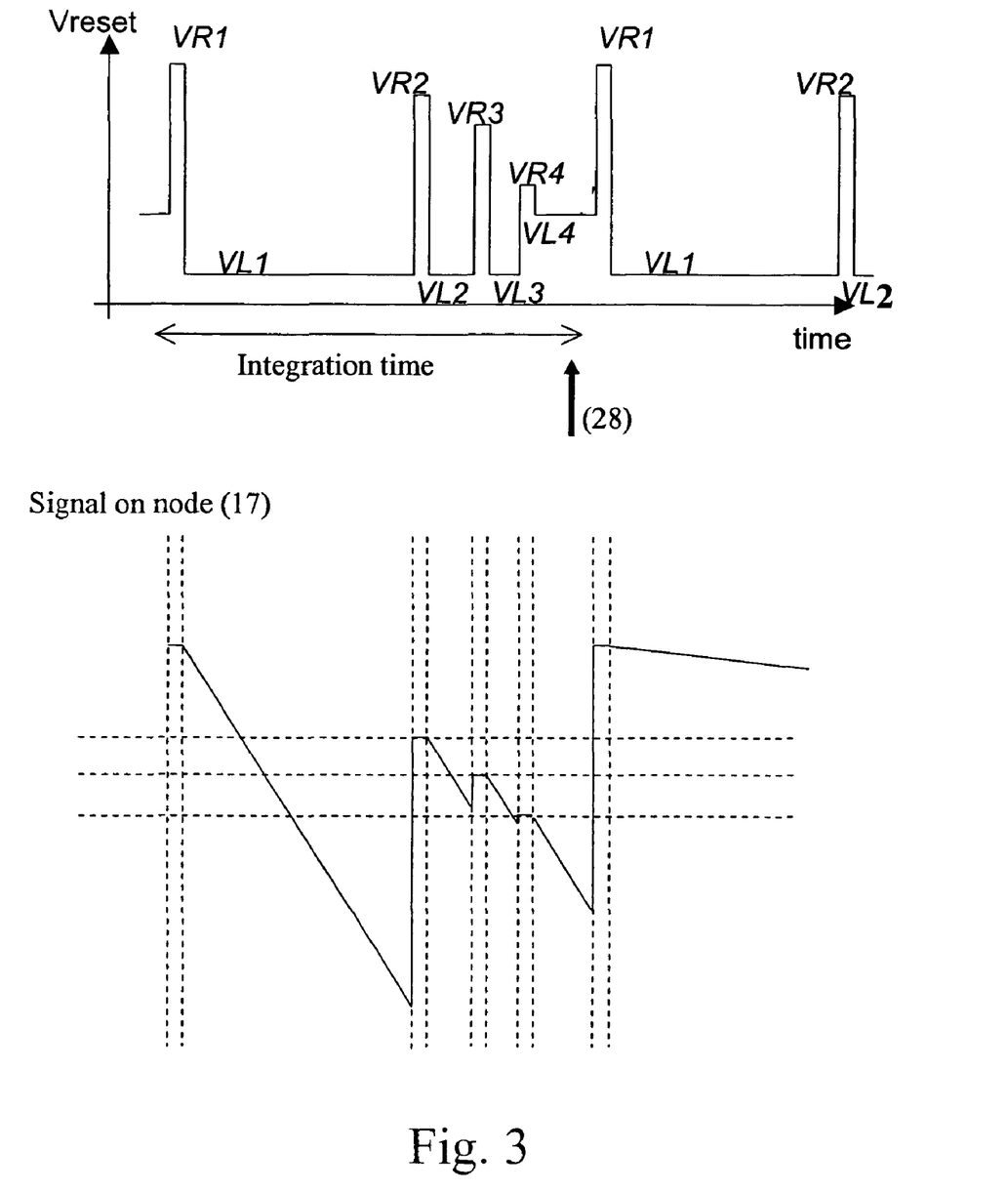
FIG. 3 represents a graph of a possible pulse train on the reset gate that can be used for obtaining a read-out of a pixel in accordance with certain embodiments described herein.

The above response curve, consisting of multiple piece-wise linear pieces 21 and a final logarithmic saturation behavior 22 can be obtained by pulses applied to terminal or transistor reset (11), thus pulsing the reset gate voltage to different amplitudes, and by driving the pixel in weak inversion. An example of the pulsing of the reset gate is shown in FIG. 3. A frame period starts with a reset of the photodiode node or charge storage node (17) by a pulse with value VR1, and ends with sampling the signal on the photodiode node (17). In the beginning of this frame period, photodiode node (17) is discharged by the application of a prior pulsed reset signal on said charge storage node (17). The prior reset pulse forces a voltage on the node (17) and during the time of application of this prior reset pulse, there is no integration of charge carriers taking place. After this prior reset pulse signal, by accumulation or acquisition of photocharges, the voltage on the node (17) drops.

Each of the lower amplitude reset pulses VR1, VR2, ... (reset pulses with a lower amplitude than the prior reset pulse) will partially discharge the photodiode node (17), and resets the photodiode node (17) to a value that is each time less high. In between the high levels, the reset gate is on low levels VL1 ... VL4, which may all be at the same level, but which may also be at different levels, as illustrated in FIG. 2. Some of these low levels may even coincide with a following VR high level (not represented in the drawings). This can be, e.g., if VL1 is the same as VR2. The low reset levels, and especially the last low reset level VL4 occurring at the read out moment shown with arrow (28), determine the voltage level at which the pixel saturates. As the MOSFET (11) is, according to certain embodiments, at that time in weak inversion, the resulting signal obeys a logarithmic photocurrent-to-voltage law expressed by Equation (2):

$$V = \log(I) \cdot \frac{kT}{q} + V_{offset}, \quad (2)$$

wherein I is the instantaneous photocurrent and $V_{offset}$ is a voltage that is a direct function of the reset gate voltage during the sample moment. This allows certain embodiments to obtain logarithmic saturation behaviour in the detector. For a reset pulsetrain of the reset gate as shown in FIG. 3, this corresponds with VL4, the reset voltage level during the read out moment indicated with arrow (28).

In FIG. 3, the signal on the node (17) during the period prior to the first readout moment (arrow 28) is in case of a high light intensity. The signal on the node (17) during the period after the first readout moment (arrow 28) is in case of a low light intensity. The period after the first readout moment (28) and prior to the second readout moment (not shown in FIG. 3) is the case where the light intensity is low. Here also the voltage drops, but slower. The second, lower amplitude (which is of the same amplitude as the reset pulse in the first period) reset pulse VR2 will not discharge the photodiode. As a result, when the light level is low, the full time lapse between two prior reset pulses of a 'high' amplitude VR1 is used for light detection. When the light level becomes so high that the charge is partially reset by any of the lower amplitude reset pulses, the additional signal is only the light accumulated after the lower reset pulse and the final read-out signal has a different voltage than in the case of a low light intensity.

Other exemplary embodiments are described below.

Figure 4:
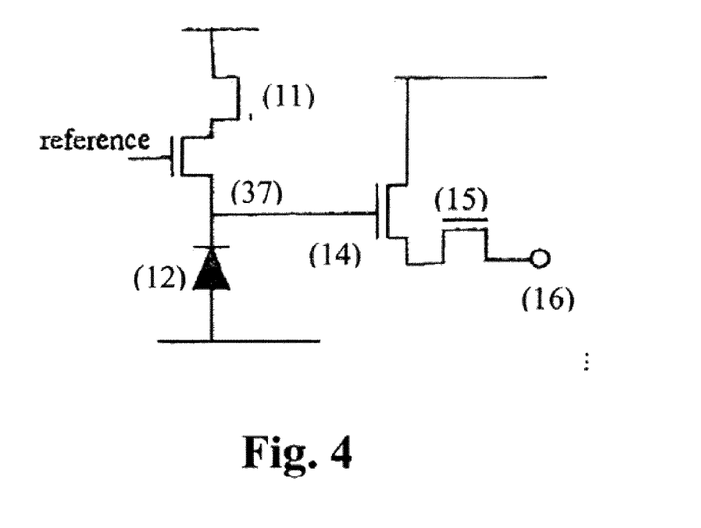
FIGS. 4 and 5 represent alternative pixels in accordance with certain embodiments described herein.
Figure 5:
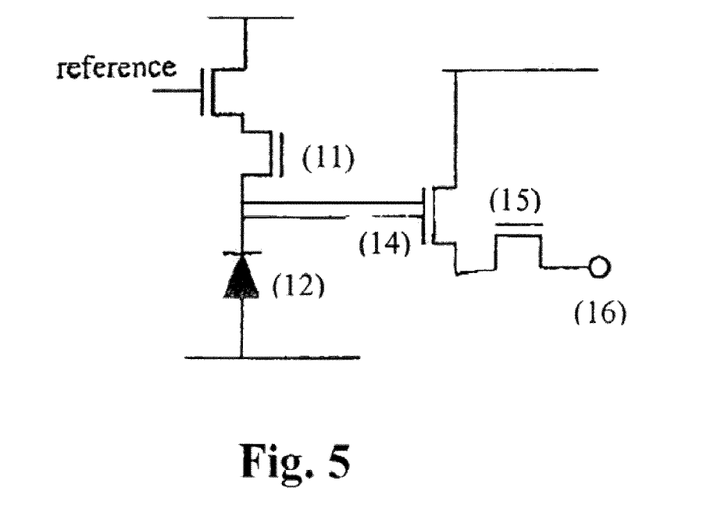
Figure 6:
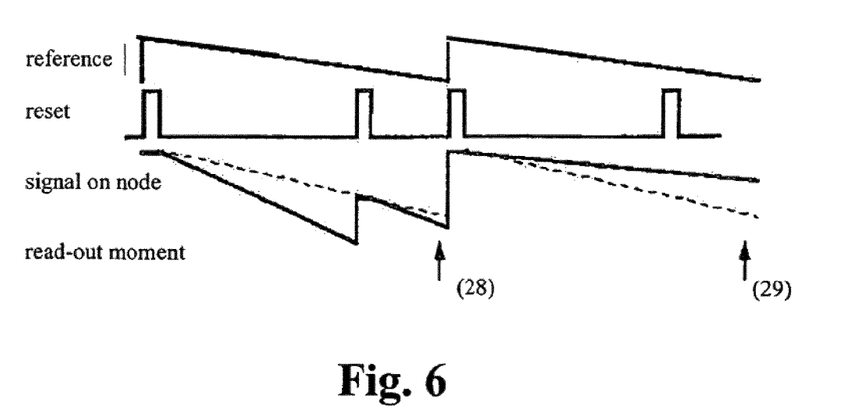
FIG. 6 represents a graph showing an alternate embodiment as applied to the pixels of FIGS. 4 and 5.

FIGS. 4, 5, and 6 show alternate pixel configurations and signal characteristics according to alternate embodiments described herein. In certain embodiments, the amplitude of the reset pulse is modulated. In certain embodiments, the method corresponding to FIG. 6 uses a fixed amplitude for the prior reset pulse and the reset pulse itself, i.e. all those pulses having a same amplitude level. A reference voltage, see FIG. 4, is applied to a transistor in between the reset transistor (11) and the photodiode or storage node (17). The reference voltage may be varied in steps, pulses, or continuously during the image acquisition period of the pixel. In certain such embodiments, the charge storage node (37) is reset to a level determined by the reference voltage. The reference voltage may slowly drop during the integration time (as shown in FIG. 6), or vary in steps (not illustrated in the drawings).

In accordance with certain embodiments, the method also uses a fixed amplitude reset pulse, and a second reference voltage (FIG. 5). This reference voltage is applied to a transistor in between the reset transistor (11) and the supply voltage applied to the drain of the reset transistor (11).

Figure 7:
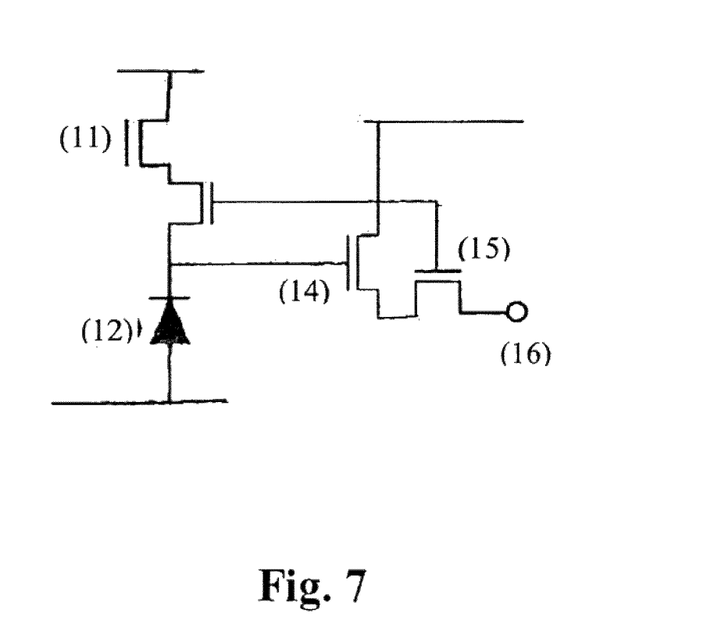
FIGS. 7 and 8 represent alternative exemplary pixels in accordance with certain embodiments described herein.
Figure 8:
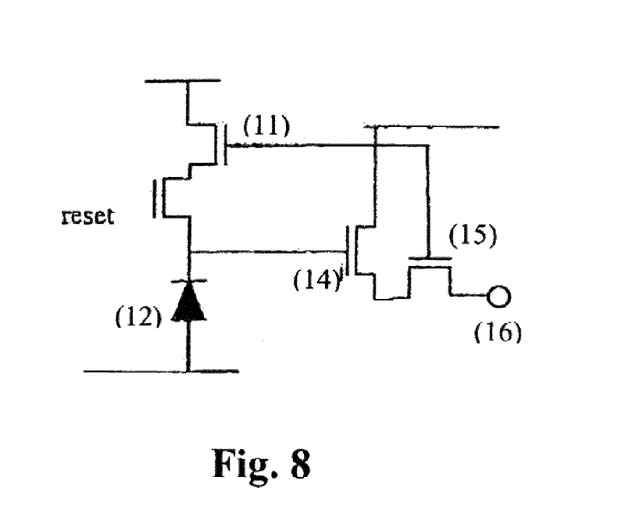
Figure 9:
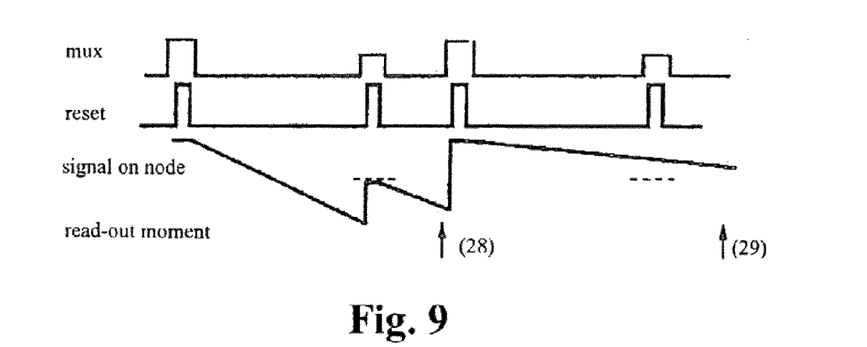
FIG. 9 represents a graph showing an alternate embodiment as applied to the pixels of FIGS. 7 and 8.

Other alternate embodiments of pixel configurations are shown in FIGS. 7 and 8 and corresponding signal characteristics are shown in FIG. 9.

Figure 10:
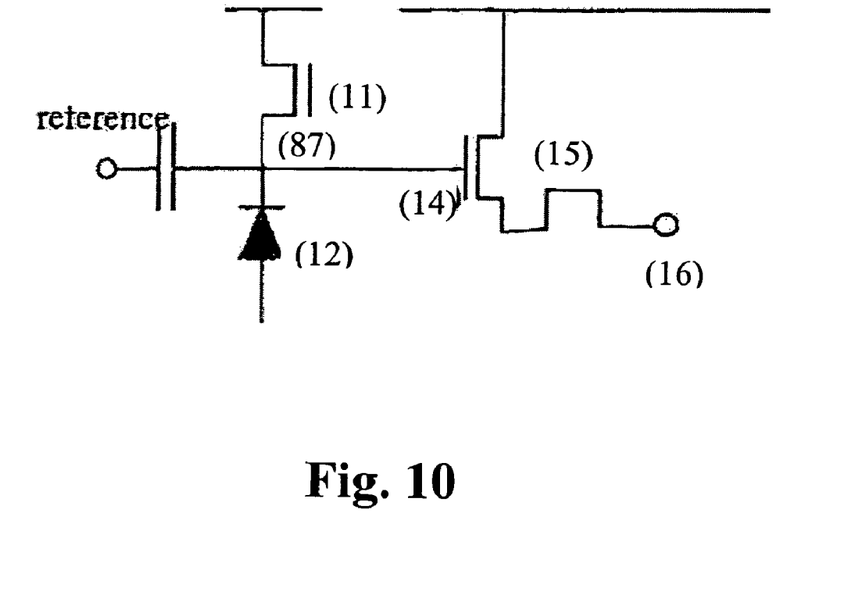
FIG. 10 represents an exemplary pixel in accordance with certain embodiments described herein.
Figure 11:
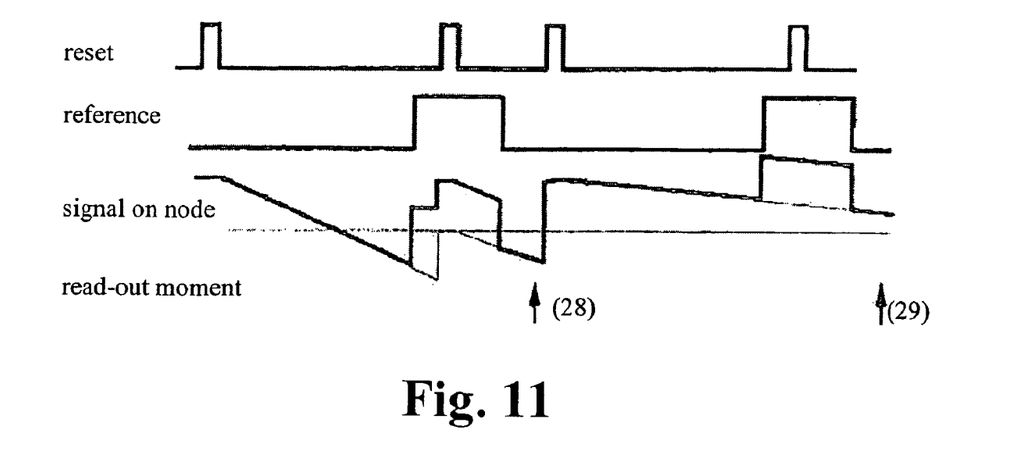
FIG. 11 represents a graph showing an alternate embodiment as applied to the pixel of FIG. 10.

In certain embodiments corresponding to FIGS. 10 and 11, the reset pulse occurs twice (or more) during, and interrupting while being applied, the integration time. The reset pulse has a fixed amplitude. A reference signal is applied capacitively to the charge storage node (87), and will result in a shift of the node voltage, hence a shift in the charge level after reset. The signal on the charge storage node (87) is in thick line. The thin line in the "signal on node" graph represents the integrated charge on the node (87), not including the effect of the capacitive coupling of the reference in the node.

In certain embodiments described above, at least two different reset levels are used thus obtaining a response with multiple piece-wise linear pieces 21 and a final logarithmic saturation behavior. It is a straightforward extension to apply 3, more than 3, or even a continuously varying level for the reset pulses.

Figure 12:
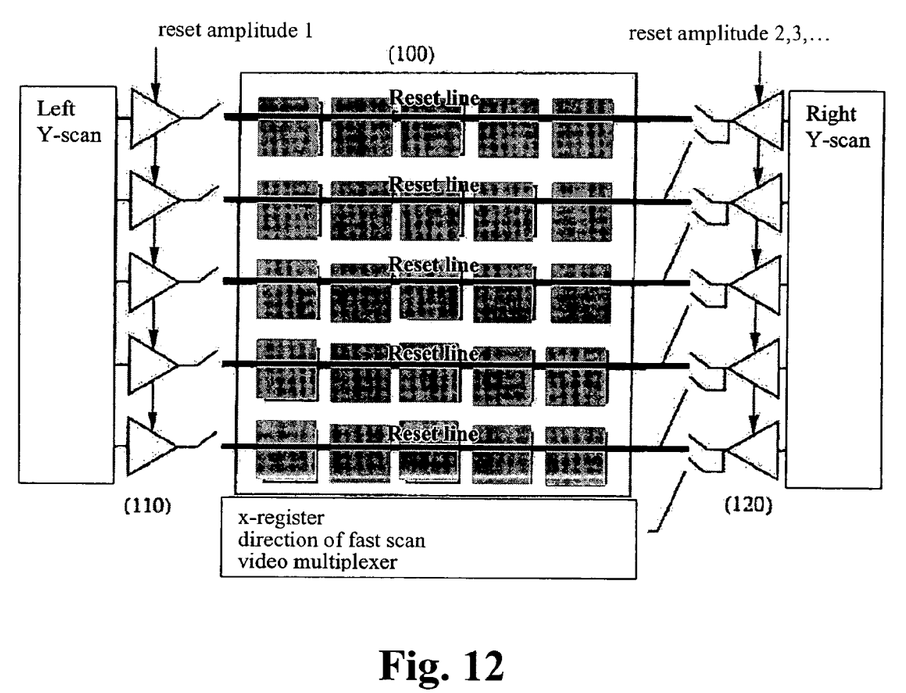
Figure 13:
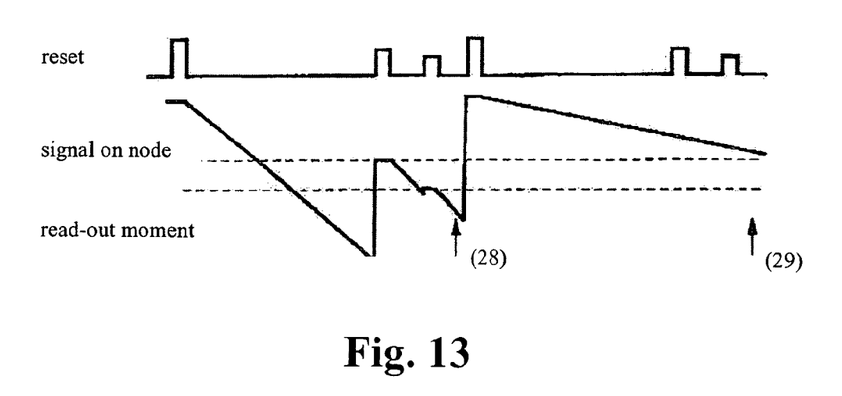
FIG. 13 shows an exemplary pulse pattern generated by the circuit of FIG. 12, as applied on an individual pixel of the sensor array.

An exemplary image sensor in accordance with certain embodiments described herein is shown in FIGS. 12 and 13. On an array of pixels (100), the reset pulses can be generated at the edges parallel to the columns of the image sensor (110) (120). In the image sensor of FIG. 12, a main reset pulse for consecutive lines of pixels is generated by the circuitry at the left side of the array (110). A vector of reset line drives is fed by a common "reset amplitude 1." At the right side (120), a similar circuit is present that can apply also pulses or voltages to the reset lines, but which may:

have different amplitudes,
occur at different moments in time, and/or
may act up on different lines, even if driven by the same reset line driver.

In certain embodiments which allow a choice between the left (110) or right circuit (120) to take action, switches are present between the reset line drivers and the reset lines. In FIG. 12, it is also schematically indicated that a reset line driver may take action on 2 (more is also possible) lines at choice, also by switches in between the reset line drivers and the reset line. The above circuit is able to generate the pulse pattern shown in FIG. 13, as seen by an individual pixel of the sensor. The result is a pixel response with 2 linear parts and a logarithmic part by driving the pixel in weak inversion after the last incomplete reset pulse.

It is to be understood that although preferred embodiments, specific constructions and configurations, as well as materials, have been discussed herein for devices according to the present invention, various changes or modifications in form and detail may be made without departing from the scope and spirit of this invention.

What is claimed is:

1. A method for obtaining a read-out signal of a pixel having at least one photosensitive element and a charge storage node, the method comprising:

acquiring charge carriers on said charge storage node during an integration period by converting the charge carriers from radiation impinging on the photosensitive element;

during a first time period of said integration period applying at least one reset pulse to a reset transistor with a predetermined amplitude on said charge storage node, said pulse resetting incompletely the charge carriers acquired at the moment of applying said pulse; and after each of at least one reset pulse further acquiring charge carriers on said charge storage node;

said method further comprising
driving said reset transistor of said pixel in weak inversion during a second time period after the last incomplete reset pulse of said integration period;
further acquiring charge carriers on said charge storage node during said second time period.

2. The method according to claim 1, wherein a plurality of reset pulses is applied on the charge storage node during the first time period.

3. The method according to claim 2, wherein at least two of said plurality of reset pulses have different amplitudes.

4. The method according to claim 1, further comprising applying a reference signal on said charge storage node whereon said at least one reset pulse is superimposed.

5. The method according to claim 1, wherein said at least one reset pulse is delivered by a reset transistor, said reset transistor being in series with said photosensitive element.

6. The method according to claim 1, wherein the read-out signal is a function of a combination of charges acquired prior and after application of said reset pulses.

7. The method according to claim 1, wherein said pixel is implemented in a MOS technology.

\* \* \* \* \*